United States Patent [19]
Gibson

[11] Patent Number: 5,535,484
[45] Date of Patent: Jul. 16, 1996

[54] UTENSIL HANDLE

[76] Inventor: Jeremy H. Gibson, 34234 Beachpark Ave., Eastlake, Ohio 44094

[21] Appl. No.: 131,891

[22] Filed: Oct. 5, 1993

[51] Int. Cl.⁶ ..................................................... A47J 45/10
[52] U.S. Cl. ........................................................ 16/111 R
[58] Field of Search ............................. 16/111 R, 110 R, 16/110.5, 114 A, 110 A, DIG. 41; 76/106, 119; 81/177.1, 436, 489; D8/107; D7/688, 691, 368, 669, 393, 395

[56] References Cited

U.S. PATENT DOCUMENTS

| | | | |
|---|---|---|---|
| D. 142,245 | 8/1945 | Ramsthal | D7/395 |
| D. 143,568 | 1/1946 | Wemyss | D7/395 |
| D. 273,268 | 4/1984 | Smith | 16/111 R |
| D. 327,809 | 7/1992 | Hacker | D7/395 |
| D. 331,692 | 12/1992 | Rieser | D8/107 |
| 289,312 | 11/1883 | Sheldon | 16/114 A |
| 1,345,443 | 7/1920 | Hood | 81/177.1 |
| 2,724,894 | 11/1955 | Tour . | |
| 3,007,595 | 11/1961 | Remley | 16/114 A |
| 3,059,809 | 10/1962 | Thompson, III | 16/114 A |
| 3,093,172 | 6/1963 | Reed | 16/111 R |
| 3,438,413 | 4/1969 | Borah | 81/177.1 |
| 4,197,611 | 4/1980 | Bell et al. | D7/395 |
| 4,381,579 | 5/1983 | Rumpp | 16/111 R |
| 4,926,521 | 5/1990 | Gagnepain | 16/110 R |
| 4,974,286 | 12/1990 | Stowell et al. | 16/111 R |

FOREIGN PATENT DOCUMENTS 2344673  3/1975  Germany ................ 81/177.1

Primary Examiner—P. Austin Bradley
Assistant Examiner—Chuck Y. Mah
Attorney, Agent, or Firm—Frank B. Robb; Robb & Robb

[57] ABSTRACT

A specialized handle for hand held utensils adapted for use by individuals including those having physical impairments such as arthritis or poor motor skill functions is provided. The specialized handle which is typically formed from an elastomeric or plastic material has a substantial rectangular shape in cross-section along a first end and along a second end. The body of the handle has a narrow first end and an enlarged second end wherein the body tapers downwardly from the second end to the first end. The handle is also provided with a plurality of radially extending flanges located along the first end which provide a positive stop which precludes the undesired movement of the user's hand beyond the first end.

27 Claims, 3 Drawing Sheets

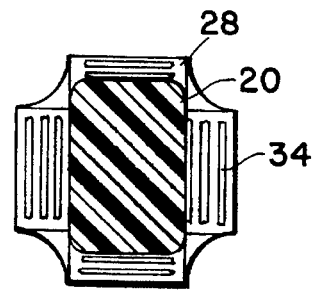
FIG. 5
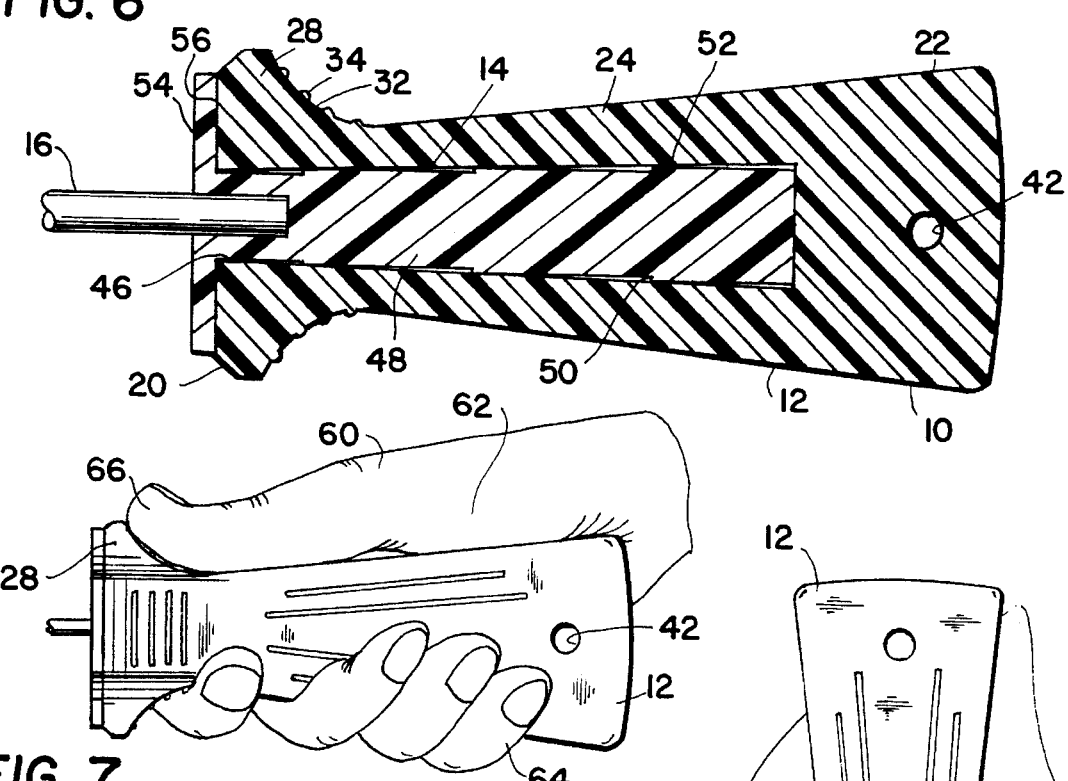
FIG. 6
FIG. 7
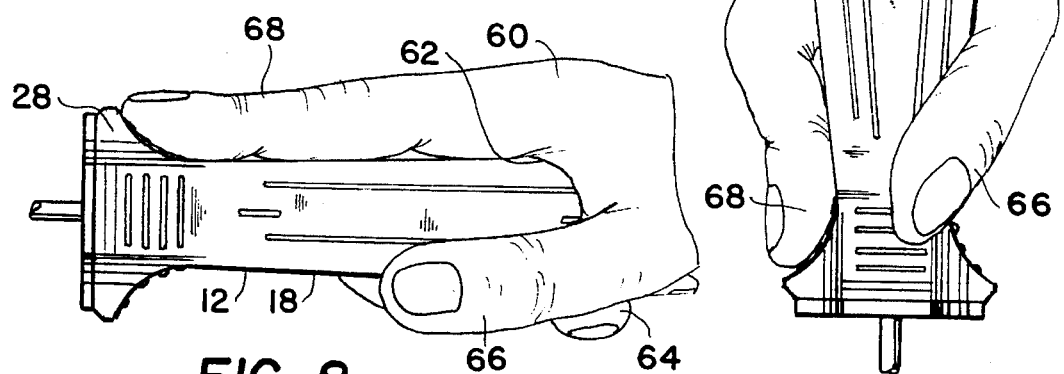
FIG. 8
FIG. 9

UTENSIL HANDLE

BACKGROUND OF THE INVENTION

I. Field of the Invention

The present invention relates generally to a utensil handle, and more particularly to a user friendly utensil handle which allows individuals, including those individuals having physical or motor function disabilities, to securely grasp the handle.

II. Discussion

Recently there has been a trend toward developing products which can be used by a majority of the population, including those individuals having physical or motor skill disabilities. So great is the trend that an entire scientific discipline, known as human factors engineering, has been developed to study the interaction between machines and utensils and the individuals who use them. Human factor engineering studies are often conducted to analyze the effects of shape, size, strength and overall functionality of an object with respect to the user. By obtaining such information scientists are better able to assess the needs of all individuals including those having physical disabilities. Once it is known what special needs must be addressed, the knowledge obtained through such studies can then be applied to the design of products which are useful to a larger percentage of the population.

Along these lines, U.S. Pat. No. 4,974,286 which issued Dec. 4, 1990 to Stowell et al. discloses a handle for a household or other hand held implements wherein the handle is intended to be "ergonomically" advanced. The handle includes an elastomeric body having an internal cavity socketed to the shank of the utensil, a pair of concave depressions located on opposite sides of the body and a plurality of spaced apart flexible fins anchored in the depressions to define a grip site. When the user clenches the handle with the fingers of his or her hand, the grip sites are pressed in by the forefinger and thumb.

While this handle may be an advancement over previously known designs it falls short of accommodating certain physically impaired individuals. For example, individuals having advanced arthritis may have difficulty deflecting the fins which extend from the depressions. Further, the handle as disclosed fails to provide any type of meaningful safety hilt or shield which would prevent the hand from slipping toward the implement portion of the tool.

SUMMARY OF THE INVENTION

In light of the foregoing discussion, the primary object of the present invention is to provide a handle for a utensil which is structurally adapted to render the handle useful by a majority of the population, including those individuals having physical or other motor skilled disabilities.

One feature of the handle in accordance with the teachings of the present invention is that it has a unique geometry, so that the user can firmly grasp the handle without having to firmly clench their fist about the handle. Under at least one application the handle is "oversized" to fit within the user's palm, such that the user's fingers can be wrapped around a majority of the handle.

Another advantage of the present invention is that it is provided with an exaggerated positive stop for reducing the likelihood that an individuals hand would come in contact with the tool portion of the utensil.

Another advantage of the present invention is that it may be formed from an elastomeric, polymeric or a combination of elastomeric and polymeric materials which provides some cushioning and can also provide insulation when excessive heat is applied to a portion of the utensil other than the handle.

Yet another object of the present invention is that the handle includes a plurality of ribs, projections and other means for enhancing and improving the grip of the handle.

Still another object of the present invention is that utensils can be produced in large quantities at a low cost.

Still another object of the present invention is to provide a utensil handle which is adaptable for a number of differing applications and various hand positions depending upon the particular use for the utensil.

Such objects are accomplished by providing a utensil handle having a first end which is substantially rectangular in cross-section and a second end which is substantially elliptical in cross-section wherein the second end is substantially larger than the first end. Extending between the first and second ends is the handle's mid-section. The handle is generally tapered downwardly from the second end in the direction of the first end thus naturally encouraging the user to grasp the handle near the smaller first end. The rectangular cross section allows the handle to be used with various hand positions. The utensil handle is also provided with either a fluted portion or a plurality of flanges extending radially outwardly near the first end of the handle which form a positive stop to reduce the likelihood of injury to the user due to slippage of the user's hand in the direction of the tool portion of the utensil. Generally, the handle also includes means such as projecting ribs for enhancing and increasing the grip of the handle. Ideally, the body of the handle is slightly oversized to conform to the palm area of the user's hand when grasped.

BRIEF DESCRIPTION OF THE DRAWINGS

Additional benefits and advantages of the present invention will become apparent from a reading of the description of preferred embodiments taken in conjunction with the specific examples provided and the drawings, in which:

FIG. 5 is a cross-sectional view of the specialized handle taken through line 5—5 of FIG. 1;

FIG. 6 is a longitudinal sectional view of the specialized handle taken through line 6—6 demonstrating the stem of the tool portion being mechanically retained within the cavity of the handle;

FIG. 7 is a view illustrating a first hand position for grasping the specialized handle;

FIG. 8 is a view illustrating a second hand position for grasping the specialized handle;

FIG. 9 is a view illustrating a third hand position for grasping the specialized handle;

DETAILED DESCRIPTION OF THE PREFERRED EMBODIMENT

A specialized handle according to the teachings of the present invention may be used in conjunction with a variety of hand held tools or utensils for use both indoors and outdoors, including but not limited to, knifes, bottle-openers, spatulas, spoons, vegetable peelers, bread slicers, ladels, tongs, whisks, various pans, and the like.

Figure 1:
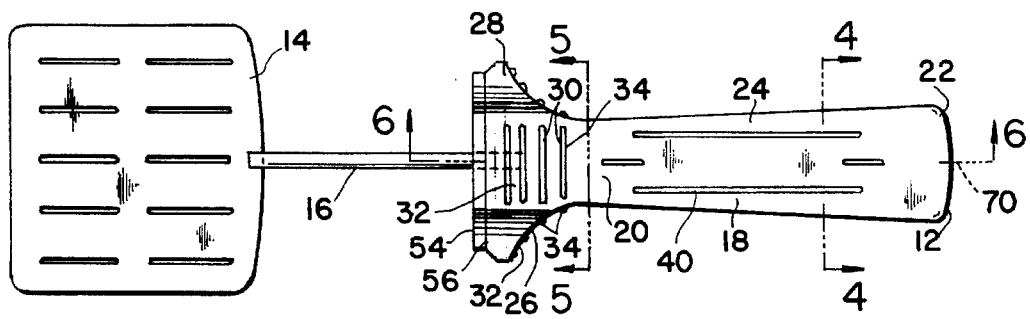
FIG. 1 is a top view of a hand held utensil including a specialized handle in accordance with the teachings of the present invention.
Figure 2:
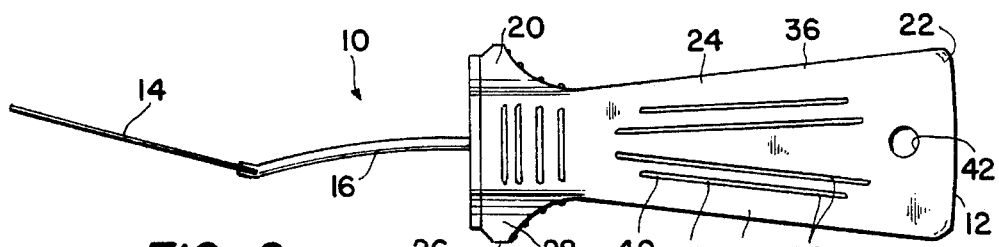
FIG. 2 is a side view of the utensil of FIG. 1.
Figure 3:
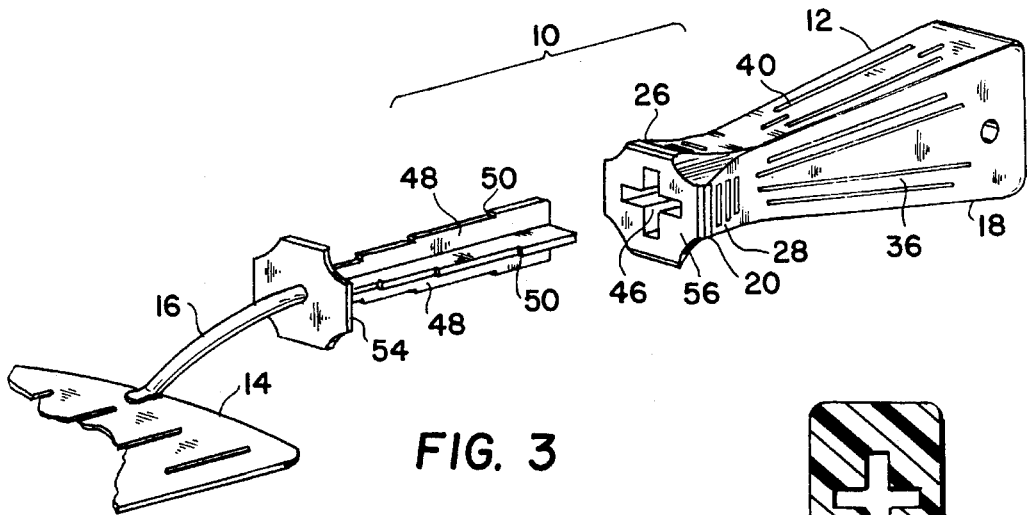
FIG. 3 is an exploded perspective view of the utensil of FIG. 1.
Figure 4:
FIG. 4 is a cross-sectional view of the specialized handle taken through line 4—4 of FIG. 1.
Figure 10:
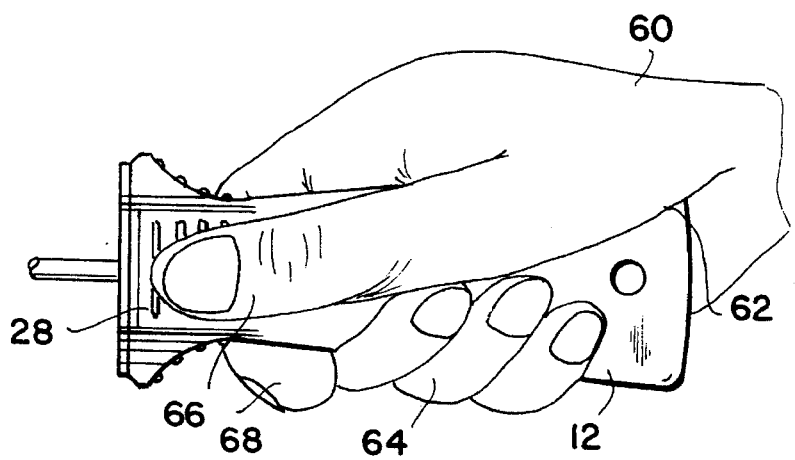
FIG. 10 is a view illustrating a fourth hand position for grasping the specialized handle.

Referring to FIGS. 1, 2 and 3 a utensil 10 having a specialized handle 12 in accordance with the teachings of the present invention is provided. The specialized handle 12 is adapted to be used with a tool portion 14 which typically includes a stem 16 which is embedded or otherwise joined to the handle as will be described in further detail below.

The handle 12 includes a body 18 having a first end 20 which is substantially rectangular in cross-section (i.e. square) and a second end 22 which is substantially elliptical in cross-section wherein both cross-sections are taken perpendicular and transverse to the longitudinal axis which is designated as reference numeral 70. As shown most clearly in FIG. 5, the corners 72 of the handle 12 which occur along the substantially rectangular cross-sectional area at the first end 20. Preferably, the body 18 of the handle 12 is tapered consistently downwardly from the second end toward the first end, thus naturally encouraging the user to grasp the handle near the narrower first end 20. Located between the first and second ends 20 and 22, respectively, is the midsection 24.

The handle 12 also includes means 26 disposed proximately along the first end 20 of the handle 12 for providing a positive stop intended to preclude advancement of the user's hand toward the tool portion 14 while the handle is being grasped. According to the handle embodiment demonstrated in FIGS. 1 through 10 and continue from at least one of the flat surfaces formed by the rectangular cross section of first end 20 the means 26 are in the form of a plurality of flanges 28 which extend radially outwardly from the body 18. Preferably, the flanges 28 are spaced apart such that at least two and ideally four flanges are provided along the first end 20 of the handle 10. Generally, the flanges 28 are substantially equidistantly spaced apart about the first end of the handle.

Each of the flanges 28 are provided with means 30 for enhancing the gripping surface 32 of the respective flange. The means 30 generally are in the form of a plurality of ribs 34 projecting from and above the gripping surface 32 of the flange. It should be understood by those skilled in the art, that although means 30 have been particularly described as being a plurality of projecting ribs other grip enhancing means, such as a plurality of depressions or grooves (not shown) extending below the gripping surface, could be utilized according to the teachings of the present invention.

The body 18 of the handle 12 also includes a gripping surface 36. The gripping surface 36 which is provided on the outer diameter of the handle along the mid-section 24 also preferably includes means 38 for improving the gripability of the handle. The means 38 include a plurality of beads 40 extending above the gripping surface 36 of the body 18. According to this embodiment the beads 40 are elongated bands disposed substantially parallel to the longitudinal axis of the handle. While the means 38 have been described particularly as being in the form extending beads, it should be understood that other means for improving the gripability of the handle along the mid-section such as projecting annular rings (not shown) disposed circumferentially around various portions of the handle's body or individual randomly spaced projections extending slightly above the gripping surface 36, should be considered as substitutes.

Adjacent the second end of the handle 12 is an aperture 42 extending through the handle. The aperture is provided to allow the utensil 10 to be suspended from a post or hook during periods of non-use.

Referring to FIGS. 1, 3 and 6, one method for manufacturing the utensil 10 according to the teachings of the present invention is shown. The handle 12 which is formed from a plastic or polymeric material, including but not limited to various elastomeric materials such as is provided with an internal cavity 46 extending from the first end 20 toward the second end 22 of the handle along the longitudinal axis. Preferably, the dimensions of the cavity 46 are substantially similar to the dimensions of the utensil stem 16. Under this embodiment the stem has a t-shape in cross-section with each of the four legs 48 including a plurality of steps 50 which mate with corresponding detents 52 provided along the cavity 46. The utensil 10 is thus formed by fully inserting the stem 16 into the cavity 46 such that the transversely disposed plate 54 provided on the tool portion 14 is positioned contiguously against the blocking wall 56 located at first end 20 of the handle. In this position the steps 50 engage the detents 52 to preclude removal of the tool portion from the handle. Optionally, the stem can also be adhesively bonded within the cavity.

Figure 11:
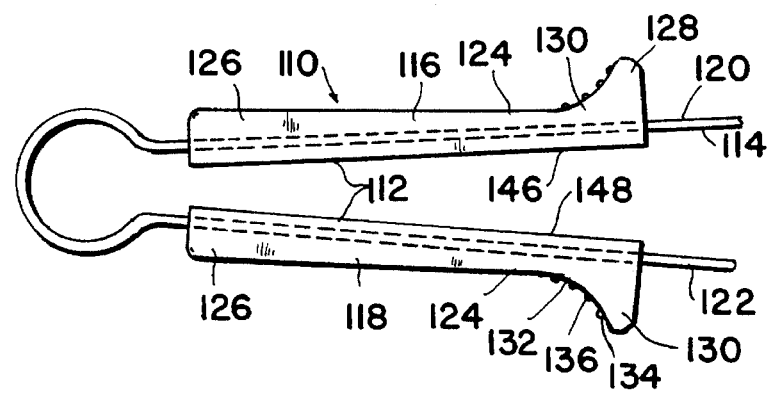
FIG. 11 is a side view of an alternative hand held utensil embodiment in accordance with the teachings of the present invention.
Figure 13:
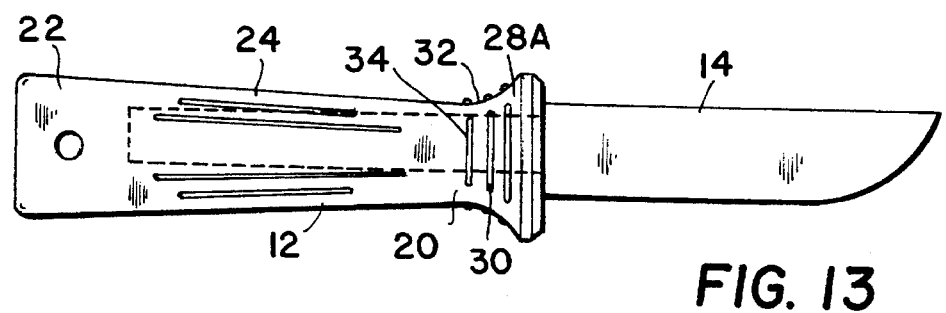
FIG. 13 is a side view of a hand held utensil demonstrating the stem of the tool portion integrally molded within the handle.

Alternatively, and generally preferably, as demonstrated in FIGS. 11 and 13 the stem 16 is integrally molded within the handle during formation of the handle to permanently attach the tool portion to the handle.

Referring to FIG. 13 a subtle modification of the handle embodiment shown in FIGS. 1 through 10 is provided. The handle 12 is essentially identical to the embodiment shown in FIGS. 1 through 10 except that the flanges have been replaced by a continuous fluted skirt 28A which extends radially outwardly from the body of the handle near the first end. The fluted skirt portion also includes means 30 for enhancing the grip of the gripping surface 32. The means 30 are again in the form of a plurality of ribs 34 extending above the gripping surface 32.

Figure 12:
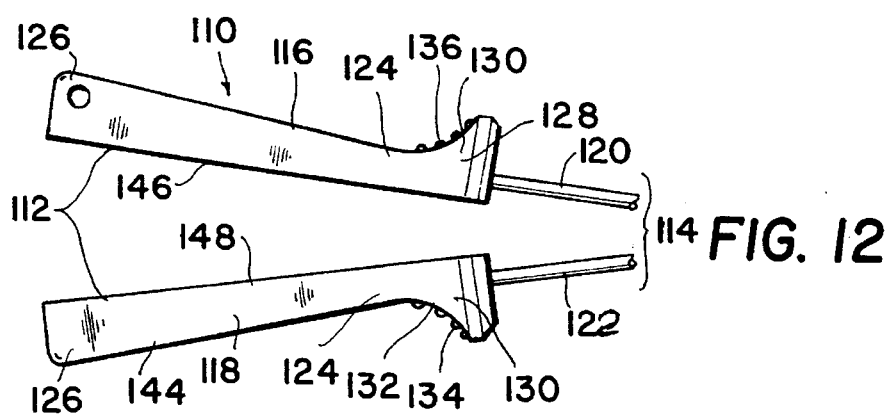
FIG. 12 is a side view of the handle of FIG. 11 as used in association with a different utensil.

Referring to FIGS. 11 and 12 a second type of utensil 110 having a specialized handle 112 according to the teachings of the present invention is provided. Under this embodiment the handle 112 includes first and second symmetrical portions 116 and 118 through which first and second arms 120 and 122, respectively, of the tool portion 114 extend. The first and second portions 116 and 118 include a reduced first end 124 having a substantially rectangular shape in cross-section and an enlarged second end 126 having a semi-elliptical shape in cross-section wherein the first and second handle portions are tapered downwardly from the second end toward the first end. Again, the corners 172 of the handle 112 occurring along the substantially rectangular cross-sectional area of the first end 120 are preferably rounded for added comfort upon gripping the handle.

The handle 112 also includes means 128 for providing a positive stop located proximate to the first end 120 of both the first and second portions. The means 128 are in the form of flanges 130 substantially identical to those shown in FIGS. 1 through 10. The flanges 130 include means 134 in the form of ribs 136 for enhancing the gripping surface 132 along each flange. The handle 112 also preferably includes means 140 in the form of beads 142 extending from the gripping surface 144 located along the body 138 of the handle for improving the gripability of the handle. As should be clear to one skilled in the art, when the first and second handle portions 114 and 116 are brought together such that the complimentary inner surfaces 146 and 148 are in contiguous contact the handle has essentially the same overall dimensions as the embodiment demonstrated in FIGS. 1 through 10.

The various applications of the handle embodiments will now be described in greater detail. As noted, handles which are both useful by individuals having arthritis or other physical or motor skill function disabilities and which are multi-functional depending upon the desired use are not known to exist. To meet this need the handle embodiments according to the teachings of the present invention have been developed. Referring specifically to FIGS. 7 through 10 various hand positions are demonstrated for grasping the handle 12. Referring specifically to FIG. 7 the handle 12 is shown as fitting between palm 62 and fingers 64 of the user's hand 60 with the user's thumb 66 engaging one of the flanges 28. Various utensils such as knives and frying pans are often grasped in this manner. According to FIG. 8 the user's hand position has been rotated such that the body 18 of the handle 12 fits between the user's palm 62 and thumb 66 with the user's index finger 68 extending longitudinally along the body 18 and engaging one of the flanges 28. In the position the handle 12 would be useful for utensils such as paring and chopping knives, among others. Referring to FIG. 9 the handle 12 is being grasped between the user's thumb 66 and index finger 68. The handle 12 under this hand position is particularly useful for utensils such as whisks wherein quick wrist action is required. According to FIG. 12 yet another hand position is demonstrated in association with the handle 12. Under this hand position the handle 12 is again maintained between the user's fingers 64 and palm 62 such that the fingers wrap around the body 18 of the handle 12. As will be clear to one skilled in the art the handle 12 as shown is particularly useful for utensils such as frying pans and carving knives under this hand position.

Although FIGS. 11 and 12 have not been illustrated to show a user's hand engaging the handle 112 it should be clear to one skilled in the art that the handle 112 as demonstrated in FIG. 11 would be particularly useful for utensils such as flexible or pivotable tongs. Likewise, it should be clear that the handle 112 as demonstrated in FIG. 12 can also be used with utensils such as nut crackers and the like.

The various handle embodiments described herein and shown in FIGS. 1 through 13 are inexpensive and relatively easy to manufacture using known techniques such as extrusion, injection or insert molding. For example, a base layer of polymeric material may be molded over the stem of the tool and subsequently a softer elastomeric material applied over the polymeric core to give the handle the aforementioned geometry.

Thus, while particular embodiments of the present invention have been illustrated and described, it would be obvious to those skilled in the art that various other changes and modifications can be made without departing from the spirit and scope of the invention. It is, therefore, intended to cover in the appended claims all such changes and modifications that are within the scope of this invention.

What is claimed is:

1. A specialized handle for a hand held utensil including a stem and a tool portion, the handle comprising:

a body having a reduced first end, an enlarged second end and a mid-section extending therebetween, said body including a gripping surface, said body tapering downwardly from the second end toward the first end, said first end having a substantially rectangular shape in cross-section and said second end having a substantially elliptical shape in cross-section; and means extending radially outwardly from the body along said first end for providing a positive stop.

2. The specialized handle of claim 1, wherein said means for providing a positive stop includes at least one flange having a gripping surface extending along said first end.

3. The specialized handle of claim 2, wherein said at least one flange includes means for enhancing the gripping surface of said at least one flange.

4. The specialized handle of claim 3, wherein said means for enhancing the gripping surface includes a plurality of ribs extending from said gripping surface.

5. The specialized handle of claim 2, wherein a plurality of spaced apart flanges are provided.

6. The specialized handle of claim 5, wherein four spaced apart flanges are provided each such spaced apart flange continuing from a side formed by such rectangular cross section.

7. The specialized handle of claim 1, wherein said means for providing a positive stop includes a fluted skirt extending about the periphery of the body along said first end.

8. The specialized handle of claim 7, wherein said fluted skirt further comprises a gripping surface.

9. The specialized handle of claim 8, wherein said fluted skirt includes means for improving the grip along said gripping surface.

10. The specialized handle of claim 9, wherein said means for improving the grip includes a plurality of ribs projecting from said gripping surface.

11. The specialized handle of claim 1, further comprising means disposed along said mid-section for increasing the gripability of said handle.

12. The specialized handle of claim 11, wherein said means for increasing the gripability of said handle includes a plurality of extending beads.

13. The specialized handle of claim 1, further comprising a cavity for receiving the stem of the utensil wherein the cavity wall includes means for mating with steps provided on said stem.

14. The specialized handle of claim 1, wherein said handle is made from an elastomeric material, a polymeric material, or a combination of both materials.

15. The specialized handle of claim 14, wherein the stem is embedded within the body of the handle during formation of the handle.

16. The specialized handle of claim 1, wherein said handle is over-sized to fit substantially in the users palm.

17. The specialized handle of claim 1, wherein corners of the handle occurring along the substantially rectangular shaped cross-sectional area of the first end are rounded.

18. A specialized handle for a hand held utensil including a tool portion having first and second moveable arms connected at a joint, said handle comprising:

a body separated into first and second portions with said first portion being disposed over said first arm and said second portion being disposed over said second arm, said first and second portions including a reduced first end having a substantially rectangular shape in cross-section and an enlarged second end having a semi-elliptical shape in cross-section, said body tapering downwardly from the second end toward the first end; and means extending radially outwardly from said first and second portions along the first end for providing a positive stop.

19. The specialized handle of claim 18, wherein said means for providing a positive stop includes at least one flange having a gripping surface.

20. The specialized handle of claim 19, wherein said at least one flange includes means for enhancing the gripping surface of said flange.

21. The specialized handle of claim 20, wherein said means for enhancing the gripping surface includes a plurality of ribs extending from said gripping surface.

22. The specialized handle of claim 18, further comprising means disposed along said body for improving the gripping surface.

23. The specialized handle of claim 22, wherein said means for improving said gripping surface includes a plurality of extending beads.

24. The specialized handle of claim 18, wherein said handle is made from an elastomeric material, a polymeric material, or a combination of both materials.

25. The specialized handle of claim 18, wherein the first and second arms are at least partially embedded within the first and second portions of the body, respectively, during formation of the handle.

26. The specialized handle of claim 18, wherein said handle is over-sized.

27. The specialized handle of claim 18, wherein the corners of the handle occurring along the substantially rectangular shaped cross-sectional area of the first end are rounded.

* * * * *